(12) United States Patent
Aucejo Romero et al.

(10) Patent No.: US 9,169,389 B2
(45) Date of Patent: *Oct. 27, 2015

(54) MODIFIED PHYLLOSILICATE

(75) Inventors: Susana Aucejo Romero, Paterna (ES); María Jordá Beneyto, Paterna (ES); José Maria Alonso Soriano, Paterna (ES); Miriam Gallur Blanca, Paterna (ES); José Maria Bermúdez Saldaña, Paterna (ES); Mercedes Hortal Ramos, Paterna (ES)

(73) Assignee: INSTITUTO TECHNOLOGICO DEL EMBALAJE, TRANSPORTE Y LOGISTICA (ITENE), Paterna (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,209

(22) PCT Filed: Aug. 3, 2011

(86) PCT No.: PCT/EP2011/063406
§ 371 (c)(1),
(2), (4) Date: Feb. 22, 2013

(87) PCT Pub. No.: WO2012/017026
PCT Pub. Date: Feb. 9, 2012

(65) Prior Publication Data
US 2013/0143988 A1 Jun. 6, 2013

(30) Foreign Application Priority Data

Aug. 4, 2010 (EP) ..................................... 10382216

(51) Int. Cl.
*C08L 67/04* (2006.01)
*C08K 9/04* (2006.01)
(Continued)

(52) U.S. Cl.
CPC . *C08L 67/04* (2013.01); *C08K 3/34* (2013.01); *C08K 5/19* (2013.01); *C08K 9/04* (2013.01); *Y10T 428/1345* (2015.01); *Y10T 428/1397* (2015.01)

(58) Field of Classification Search
CPC ............ C08L 67/04; C08K 3/34; C08K 5/19; C08K 9/04; Y10T 428/1345; Y10T 428/1397
USPC ......................................................... 524/236
See application file for complete search history.

(56) References Cited

U.S. PATENT DOCUMENTS 5,364,823 A * 11/1994 Takahama et al. .............. 502/62
6,191,333 B1 2/2001 Benazzi et al.
(Continued)

FOREIGN PATENT DOCUMENTS

EP 1787918 A1 5/2007
FR 2771308 A1 5/1999
WO WO 2009/127000 * 10/2009 ............... C08K 9/04

OTHER PUBLICATIONS

ASTM E96: Standard Test Methods for Water Vapor Transmission of Materials, 24 CFR 3880.504(a), American Society for Testing and Materials, (the year of publication is sufficiently earlier than the effective U.S. filing date and any foreign priority date so that the particular month of publication is not in issue) 1995, pp. 785-792, American Society for Testing and Materials, Philadelphia, PA, USA.

(Continued)

*Primary Examiner* — John Uselding
(74) *Attorney, Agent, or Firm* — Peter B. Scull; Hamilton, DeSanctis & Cha LLP

(57) ABSTRACT

Polymer nanocomposites including: a) a polylactic polymer; and b) a modified phyllosilicate composition including a modifying agent which includes hexadecyl trimethyl ammonium cations which are intercalated between the layers of the phyllosilicate, and preparation processes therefor, as well as the modified phyllosilicate composition. The polymer nanocomposites are particularly useful for packaging, particularly food and drink packaging.

21 Claims, 4 Drawing Sheets

(51) Int. Cl.
*C08K 3/34* (2006.01)
*C08K 5/19* (2006.01)

(56) References Cited

U.S. PATENT DOCUMENTS

| | | | |
|---|---|---|---|
| 6,649,713 B2 * | 11/2003 | Tang et al. | 526/160 |
| 2004/0042750 A1 * | 3/2004 | Gillberg et al. | 385/128 |
| 2008/0004391 A1 * | 1/2008 | Chan et al. | 524/445 |

OTHER PUBLICATIONS

ASTM Designation D: 3985-02, Standard Test Method for Oxygen Gas Transmission Rate Through Plastic Film and Sheeting Using a Coulometric Sensor, ASTM International, (the year of publication is sufficiently earlier than the effective U.S. filing date and any foreign priority date so that the particular month of publication is not in issue) 2002, pp. 1-6, ASTM International, West Conshohocken, PA, USA.

European Standard, EN ISO 527-1, Version En espanol, Plasticos Determinacion de las propiedades en traccion, Parte 1: Principios Generales, (ISO 527-1:1993 incluye Corr 1:1994), Feb. 1996, pp. 1, 4-16, CEN, Comite Europeo De Normalizacion, European Committee for Standardization, Comite Europeen de Normalisation, Europaisches Komitee fur Normung, Bruxelles, Belgium. English language counterpart is BS EN ISO 527-1.

British Standard Institute, BS EN ISO 527-1:1996, BS 2782-3: Method 321:1994, ISO 527-1:1993, Incorporating Amendment No. 1, Plastics—Determination of tensile properties, (the year of publication is sufficiently earlier than the effective U.S. filing date and any foreign priority date so that the particular month of publication is not in issue) 1996, pp. 1-16, British Standard Institute, London, England. English language counterpart to EN ISO 527-1.

International Search Report and Written Opinion of the International Searching Authority, Search Report, Application No. PCT/EP2011/063405 issued by the European Patent Office, Munich, Germany, dated Sep. 14, 2011.

Aucejo-Romero et al., Approved clay-biopolymer nanocomposites for food contact applications, 16th IAPRI World Conference on Packaging, Book of Abstracts, p. 81, Jun. 8-12, 2008, Bangkok, Thailand.†

\* cited by examiner
† cited by third party

MODIFIED PHYLLOSILICATE

The present disclosure relates to a modified phyllosilicate composition having a mixture of modifying agents, its preparation process and its uses.

BACKGROUND

Preparation of modified phyllosilicates are known. Thus, under appropriate conditions an organic compound containing a cation can react by ion exchange with a phyllosilicate containing a negative layer lattice and exchangeable cations to form the modified phyllosilicate.

The modified materials are used at relatively high temperature in different applications, for example the production of food packaging. These materials at high temperatures can be unstable.

The effect of a mixture of modifying agents can result in thermal stability of the modified phyllosilicate.

Accordingly, the patent application EP1787918 describes a biodegradable polyester resin reinforced by a modified phyllosilicate. The phyllosilicate is substituted with ammonium, pyridinium, imidazolium, or phosphonium ions. Examples of ammonium ions include tetraethylammonium, octadecyltrimethylammonium, and dimethyldioctadecylammonium among other ions. The modified phyllosilicate described in this EP patent application presents one type of modifying agent.

Thus, from what is known, it can be derived that the development of modified phyllosilicates including a mixture of modifying agents with improved thermal properties may be of great interest.

SUMMARY

It has been found that modified phyllosilicate compositions having hexadecyltrimethyl ammonium cations and acetylcholine or choline are more stable at high temperatures than the phyllosilicate compositions having only hexadecyltrimethyl ammonium cations.

Thus, this modified phyllosilicate composition can be obtained at higher temperatures since no degradation of phyllosilicate compositions occurs which have the advantages of higher yields.

Therefore an aspect of the present disclosure relates to a modified phyllosilicate composition including a modifying agent of hexadecyl trimethyl ammonium cations which are intercalated between the layers of the phyllosilicate and an additional modifying agent selected from the group consisting of acetylcholine and choline.

The silicate used in this disclosure belongs to the family of phyllosilicates, preferably of the smectite group. These compounds are characterized by their swelling properties and high cation-exchange capacities.

Another aspect of the present disclosure relates to a process for the production of a modified phyllosillicate as defined above, that is a phyllosilicate including a modifying agent which includes hexadecyl trimethyl ammonium cations which are intercalated between the layers of the phyllosilicate and optionally an additional modifying agent which may be acetylcholine or choline, the process including (a) dispersing the phyllosillicate in water and an $C_1$-$C_{10}$ alcohol; (b) applying an ultrasonic wave; (c) optionally adding choline salt or acetylcholine salt (d) adding hexadecyl trimethyl ammonium salt; (e) maintaining the mixture of operation (d) at a temperature between 20° C. and 120° C.; (f) isolating the compound obtained in operation (d), wherein the operations a), b), c), and d) can be carried out in any order.

The incorporation of a modified phyllosilicate composition of this disclosure with a polymer results in a polymer nanocomposite showing improved thermal resistance.

Another aspect of the present disclosure relates to the use of the modified phyllosilicate hereof as a reinforcing agent of polymers.

DETAILED DESCRIPTION

Figure 1:
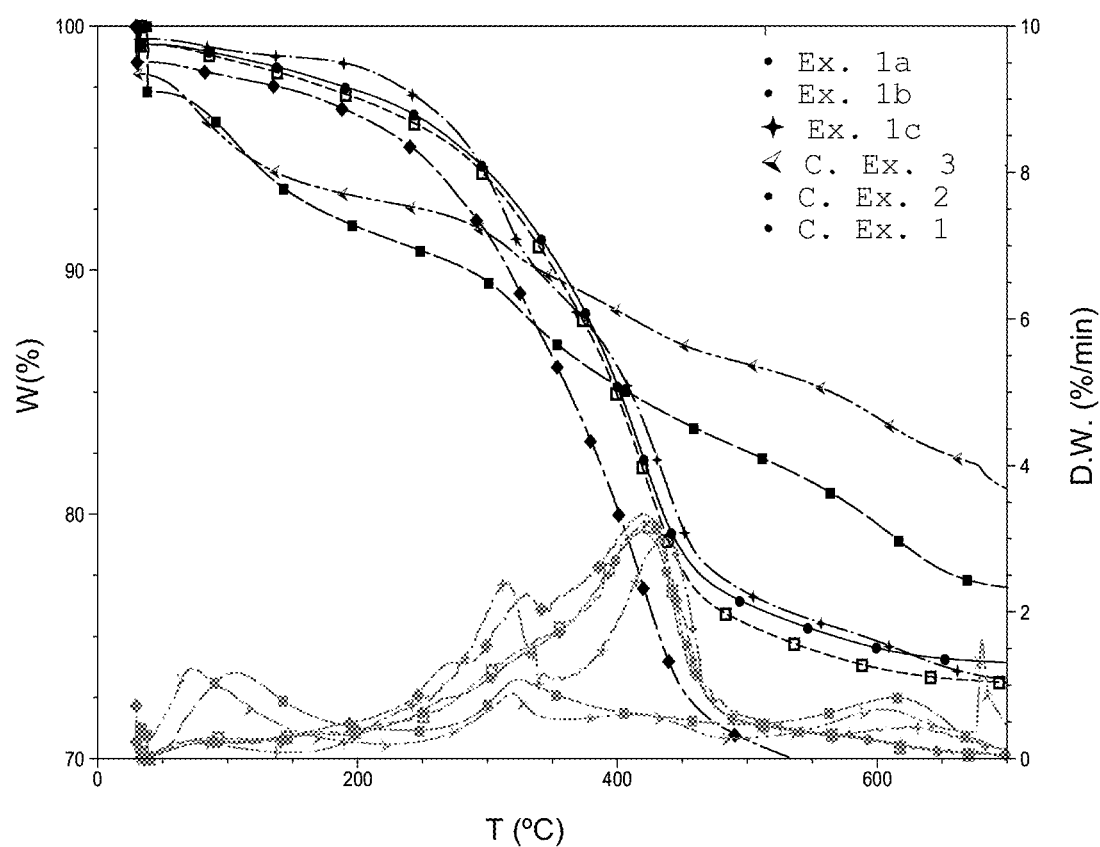
FIG. 1 shows a thermogravimetric analysis up to 700° C. performed over the modified phyllosilicates.

As mentioned above, an aspect of the present disclosure relates to modified phyllosilicate compositions including hexadecyltrimethyl ammonium cations and acetylcholine or choline.

The term "phyllosilicates" as used herein, refers to layered silicates in which the $SiO_4$ tetrahedra are linked together in two dimensional sheets and are condensed with layers of $AlO_6$ or MgO octahedra in the ratio 2:1 or 1:1. The negatively charged layers attract positive cations (e.g. $Na^+$, $K^+$, $Ca^{2+}$, $Mg^{2+}$.) which can hold the layers together. Non limiting exemplar phyllosilicates which may be used within the scope of the present disclosure are sodium montmorillonite, magnesium montmorillonite, calcium montmorillonite. In a preferred implementation, the phyllosilicate is sodium montmorillonite.

The term "modified phyllosilicates" as used herein, refers to phyllosilicates wherein the positive cations (e.g. $Na^+$, $K^+$, $Ca^{2+}$, $Mg^{2+}$), are exchanged by ion exchange reactions with alkylammonium cations as modifying agents. Particularly, the modified phyllosilicates of the present disclosure include hexadecyl trimethyl ammonium and, optionally acetylcholine or choline cations, as modifying agents.

These modifiers are added in excess to the cation exchange capacity (CEC) of the phyllosilicate and a value of 0.5-10 times the CEC was established as the optimum. The modification of a phyllosilicate with a mixture of modifiers simultaneously, provokes a favourable exchange with hexadecyl trimethyl ammonium versus choline or acetylcholine. For this reason, for the preparation of these modified phyllosilicates with a mixture of modifiers, firstly performed was the exchange with choline or acetylcholine at a low concentration (0.1-1 CEC), and afterwards the exchange with the hexadecyl trimethyl ammonium was carried out (0.4-9.9 CEC). Therefore in a more preferred implementation, in a nanocomposite hereof with a mixture of modifiers, the amount of acetylcholine or choline is 0.20-0.75 meq/100 g the value of the phyllosilicate CEC and the amount of hexadecyl trimethyl ammonium cation is 5.25-5.80 meq/100 g the value of the phyllosilicate CEC. Therefore in another more preferred implementation of a nanocomposite hereof with a mixture of modifiers, the amount of acetylcholine or choline is 0.25-0.50 meq/100 g the value of the phyllosilicate CEC and the amount of hexadecyl trimethyl ammonium cation is 5.55-5.75 meq/100 g the value of the phyllosilicate CEC.

As mentioned above, the modified phyllosilicates of the present disclosure, that is phyllosilicates including a modifying agent which includes hexadecyl trimethyl ammonium cations which are intercalated between the layers of the phyllosilicate and optionally an additional modifying agent which is acetylcholine or choline, can be prepared by a process including (a) dispersing the phyllosillicate in water and an $C_1$-$C_{10}$ alcohol; (b) applying an ultrasonic wave; (c) optionally adding choline salt or acetylcholine salt (d) adding hexadecyl trimethyl ammonium salt; (e) maintaining the mixture of operation (d) at a temperature between 20° C. and 120° C.; (f) isolating the compound obtained in operation (d), wherein the operations a), b), c), and d) can be carried out in any order.

In a preferred implementation the phyllosilicate is dispersed in water and ethanol.

In a preferred implementation, the choline salt added is choline halide. In a more preferred implementation the choline salt added is choline chloride.

In a preferred implementation, the acetylcholine salt added is acetylcholine halide. In a more preferred implementation the acetylcholine salt added is acetylcholine chloride.

In a preferred implementation the hexadecyl trimethyl ammonium salt added is hexadecyl trimethyl ammonium halide. In a more preferred implementation the hexadecyl trimethyl ammonium salt added is hexadecyl trimethyl ammonium bromide.

In a preferred implementation the optional addition of choline salt or acetylcholine salt and the addition of hexadecyl trimethyl ammonium salt is carried out slowly.

In a preferred implementation the mixture of operation (d) is maintained at a temperature between about 20° C. and about 90° C. In another preferred implementation the mixture of operation (d) is maintained at a temperature between about 50° C. and about 90° C. In a more preferred implementation the mixture of operation (d) is maintained at a temperature between about 65° C. and about 75° C.

In a preferred implementation the isolating operation f) includes purifying of the prepared modified phyllosilicate. In a more preferred implementation the phyllosilicate is purified with a solution of water:ethanol, in particular, the solution is added to the modified phyllosilicate, and the mixture is maintained under stirring at a temperature between about 50° C. and about 90° C. The product is filtered and the conductivity of the mother liqueours is measured. This process is repeated until the mother liqueours have a conductivity below 5-30 µS/cm.

In a more preferred implementation the isolating operation includes a drying operation of the phyllosilicate after the purification. The drying operation is carried out at a temperature between about 70° C. and about 90° C. It can be carried out in a conventional oven, by lyophilisation or by atomization. Generally, the drying process lasts at least about 12 hours. After the drying operation, the phyllosilicate can be milled, and sieved. Generally it is sieved to a particle size below 25 microns.

As mentioned above the modified phyllosilicate of the present disclosure can be used in the reinforcement of polymers. Preferably this can be in the reinforcement of polymers used in food packaging. Preferably this can be in the reinforcement of polyethylenes (PE), polypropylenes (PP), poly (ethylene-vinyl acetates (EVA), polystyrenes (PS), polyvinyl chlorides (PVC), ionomers (I), polyethylene terephthalates (PET), polyvinyl acetates (PVAc), polycarbonates (PC), polyamides (PA), polyvinyl alcohols (PVOH), polyvinylidene chlorides (PVDC). More preferably this can be with PP, PE, or PET.

The incorporation of a modified phyllosilicate of the present disclosure with a biodegradable polymer, in particular polylactic polymer (PLA) results in a polymer nanocomposite showing not only improved mechanical properties but also improved barrier properties and thermal resistance. The fact that the polymer nanocomposite shows excellent barrier properties is advantageous on the one hand, for its use for storage of aqueous drinks (e.g. water, juice, milk) since the loss of water vapour through the wall of the bottles is minimized. On the other hand, it is also advantageous for its use for food storage. Food containers must present a good barrier property against the diffusion of oxygen into the container, to avoid the spoliation of the food products caused by the presence of oxygen therein. In addition, the polymer nanocomposite of the present disclosure shows excellent mechanical strength and less rigidity which is an advantage for packaging long term storage, avoiding the polymer nanocomposite deformation and cracking.

Therefore, a polymer nanocomposite including a polylactic polymer and a modified phyllosilicate composition including a modifying agent which is hexadecyl trimethyl ammonium cations which are intercalated between the layers of the phyllosilicate and an additional modifying agent selected from the group consisting acetylcholine and choline are also part of the present disclosure.

Throughout the description and claims the word "comprise" and variations of the word, are not intended to exclude other technical features, additives, components, or operations. Additional objects, advantages and features of the disclosure will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred implementations described herein

EXAMPLES

Example 1

Preparation of Montmorillonite Modified with Hexadecyltrimethyl Ammonium Cations and Acetylcholine or Choline Example 1a Montmorillonite with 5.5 CEC of HDTA and 0.5 CEC of ACO Purified sodium montmorillonite (Closiste® $Na^+$) was purchased from Southern Clay Products, with moisture content between 4 and 9% CEC of sodium montmorillonite was 92.6 mequiv/100 g.

Quaternary ammonium salts were supplied by Acros Organics. Choline (CO) chloride, acetylcholine (ACO) chloride, and hexadecyltrimethyl ammonium (HDTA) bromide with 99% of purity, and trimethyloctadecylammonium bromide 98% were purchased from Fluka.

For the production of a modified phyllosilicate modified with acetylcholine and hexadecyltrimethyl ammonium cations, 20 grams of purified sodium montmorillonite were dispersed in water at 70° C. under energetic stirring. After that, 200 ml of ethanol were added. Later, the mixture was subjected to an ultrasound treatment.

Then 1.48 grams of acetylcholine chloride were dissolved in 250 ml of ethanol at 70° C. After that, phyllosilicate suspension was added slowly. Once this operation was finalized, 37.12 grams of the modifier hexadecyltrimethyl ammonium bromide were dissolved in 250 ml of ethanol, and the solution previously prepared was added. After that, the solution was kept during at least 12 hours (at 70° C.) in a continuous stirring disposition. A cation exchange reaction between the hydrated cations (inside the montmorillonite layers) and the alkyl ammonium ions was carried out in this aqueous-ethanolic solution.

The next operation includes purifying the prepared modified phyllosilicate. For this purpose a 1 l solution 50:50 vol water:ethanol was prepared. After filtering the mixture under vacuum, fresh solution was added to the modified phyllosilicate, and mixture was maintained under stirring at 70° C. at least 2 hours. The procedure was repeated until the filtered solution was below 5 µS/cm in conductivity.

The next operation includes drying of the phyllosilicate at 70° C. during at least 12 hours. Finally, the phyllosilicate was milled, and sieved to a particle size below 25 microns. The modified phyllosilicate obtained is a Cloisite (CLO) with 5.5 CEC of HDTA and 0.5 CEC of ACO.

Example 1b

Montmorillonite with 5.75 CEC of HDTA and 0.25 CEC of ACO

A CLO with 5.75 CEC of HDTA and 0.25 CEC of ACO was obtained following the process of Example 1b but using the ACO halide dissolved in 250 ml of ethanol. ACO mass was 0.84 grams, and HDTA mass was 38.81 grams.

Example 1c

Montmorillonite with 5.75 CEC of HDTA and 0.25 CEC of CO

A CLO with 5.75 CEC of HDTA and 0.25 CEC of CO was obtained following the process of Example 1b but using 0.65 grams of CO halide dissolved in 250 ml of ethanol Example 2

Preparation of Montmorillonite Modified with Hexadecyltrimethyl Ammonium Cations For the production of the montmorillonite modified with hexadecyltrimethyl ammonium cations, the same process of Example 1 was carried out but starting from 40.50 grams of hexadecyltrimethyl ammonium bromide which have been dissolved in 500 ml of ethanol. The modified phyllosilicate obtained is a CLO with 6 CEC of HDTA.

Comparative Example 1

Preparation of Montmorillonite Modified with Trimethyloctadecyl Ammonium (ODTA) Cations For the production of the montmorillonite modified with (ODTA) cations, the same process of Example 2 was carried out but starting from 43.62 grams of (ODTA) bromide. The modified phyllosilicate obtained is a CLO with 6 CEC of ODTA.

Comparative Example 2

Preparation of Montmorillonite Modified with ACO

For the production of the montmorillonite modified with (ACO) cations the same process of Example 2 was carried out but starting from 10.09 grams of (ACO) chloride. The modified phyllosilicate obtained is a CLO with 3 CEC of ACO.

Comparative Example 3

Preparation of Montmorillonite Modified with CO

For the production of the montmorillonite modified with (CO) cations the same process of Example 2 was carried out but starting from 7.76 grams of (CO) chloride. The modified phyllosilicate obtained is a CLO with 3 CEC of CO.

Example 3

Thermal Characterization of Phyllosilicates with Mixtures of Modifiers

Presence of modifiers in the phyllosilicates obtained in Examples 1a, 1b and 2 was verified with thermal characterization by TGA see FIG. 1 and its stability was compared with phyllosilicates obtained in the Comparative Examples 1, 2, and 3.

Phyllosilicates prepared with a mixture of modifiers present different weight changes, which are the contribution of both modifiers. For comparison purposes, included in this Figure, FIG. 1, are modified phyllosilicates with only one modifier (hexadecyltrimethylammonium, acetylcholine or choline). It was observed that the modified phyllosilicate, montmorillonite with octadecyltrimethylammonium was the less thermally stable, with a big difference relative to the other modified phyllosilicates.

As most of the content of the modified phyllosilicates with a mixture of modifiers (hexadecyltrimethylammonium and acetylcholine) was hexadecyltrimethylammonium bromide, one could think that these phyllosilicates would have the same behaviour as hexadecyltrimethylammonium bromide. However, an unexpected effect was produced, and the modified phyllosilicate with a mixture of modifiers resulted in being more thermally stable in the range of temperatures between 285 and 388° C.

Example 4

Preparation of PLA-Phyllosilicate Nanocomposites

Example 4a

PLA4042-Phyllosilicate (Montmorillonite with 5.5 CEC of HDTA and 0.5 CEC of ACO)

PLA nanocomposite samples were obtained with the modified phyllosilicate prepared in Example 1a, and PLA 4042.

For this purpose a DSM Xplore Microcompounder (15 cc) was used. PLA pellets (dried overnight at 60° C.) were blended with 4% by weight of modified phyllosilicate in this co-rotating twin screw micro-extruder. The temperature of processing was 200° C. The rotation speed of the screw was maintained at 100 r.p.m., and residence time was set to 10 min. After extrusion, the melted materials were transferred through a preheated cylinder, 200° C., of a mini injection moulding machine (4 cc) (DSM Xplore) to obtain bone-like specimen samples (ISO 527 standard; probe type 5A-B).

Example 4b

PLA4042-Phyllosilicate (Montmorillonite with 5.75 CEC of HDTA and 0.25 CEC of ACO)

The same process of Example 4a was carried out but with the modified phyllosilicate prepared in Example 1b.

Example 4c

PLA4042-Phyllosilicate (Montmorillonite with 5.75 CEC of HDTA and 0.25 CEC of CO)

The same process of Example 4a was carried out but with the modified phyllosilicate prepared in Example 1c.

Example 4d

PLA4042-Phyllosilicate (Montmorillonite with HDTA)

The same process of Example 4a was carried out but with the modified phyllosilicate prepared in Example 2.

Example 4e

PLA2002-Phyllosilicate (Montmorillonite with 5.75 CEC of HDTA and 0.25 CEC of ACO)

The same process of Example 4a was carried out but with PLA2002 and the modified phyllosilicate prepared in Example 1b.

Example 4f

PLA2002-Phyllosilicate (Montmorillonite with HDTA)

The same process of Example 4a was carried out but with PLA2002 and the modified phyllosilicate prepared in Example 2.

Comparative Example 4

Preparation of PLA4042-Phyllosilicate (Montmorillonite with ODTA)

The same process of Example 4a was carried out but with the modified phyllosilicates prepared in Comparative example 1.

Comparative Example 5

Preparation of PLA2002-Phyllosilicate (Montmorillonite with ODTA)

The same process of Example 4a was carried out but with PLA2002 and with the modified phyllosilicates prepared in Comparative example 1.

Example 5

Characterization of the PLA-Phyllosilicate Nanocomposites of Example 4

Mechanical Properties

Mechanical properties were evaluated using a universal testing machine (model M350-20CT), following standard ISO-527.

Figure 2:
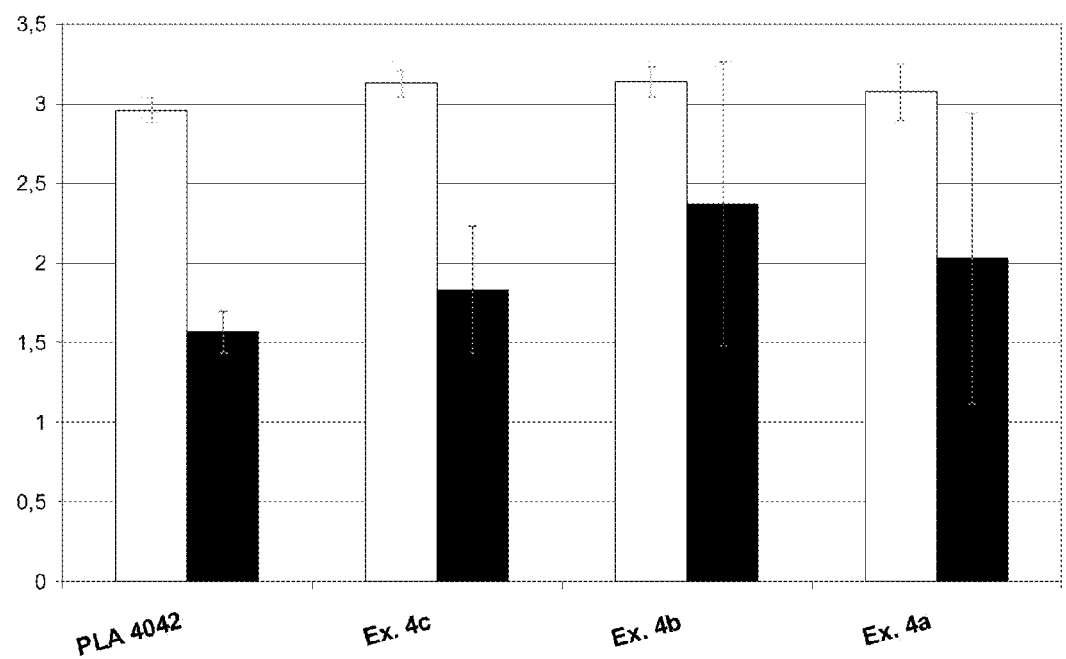
FIG. 2 shows the young Modulus (GPa), (white column) and the elongation at break (mm), (black column) of different samples.

Results are presented in FIG. 2 showing the Young Modulus and the elongation at break of PLA, (nanocomposites obtained in Example 4a, 4b, and 4c).

As can be observed in FIG. 2, the young Modulus was increased in the case of PLA nanocomposite versus PLA pure, and also an increase in the elongation at break was observed (best result obtained with nanocomposites prepared in Example 4b) with respect to PLA pure. This was an unexpected result since an increase in Young Modulus generally implies a decrease in the elongation at break.

Figure 3:
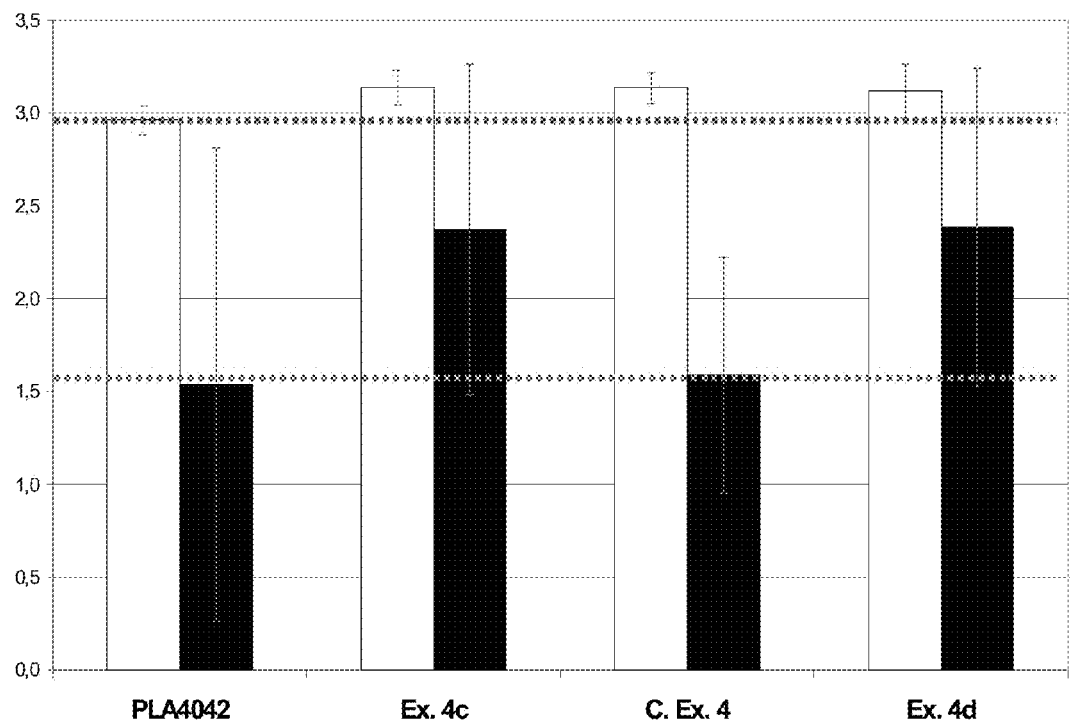
FIG. 3 shows the young Modulus (GPa), (white column) and the elongation at break (mm), (black column) of different samples.

Comparative results of nanocomposites based on PLA 4042 are shown in FIG. 3. It can be seen that the use of modified phyllosilicate of the present disclosure produces an increase in Young Modulus, and also an increase in the elongation at break, as occurred previously in respect of the nanocomposite of comparative example 4. Elongation at break reaches higher values when nanocomposites prepared in Example 4f and 4b were used.

Water Vapour Transmission Rate (WVTR)

Samples were evaluated following the standard ASTM E96 at 23° C. and 50 RH (Relative Humidity) (desiccant method).

Results are shown in Table 1. The smaller the value of the water vapour permeability, the more excellent is the barrier property.

The maximum reduction in WVTR at these conditions was reached with a sample wherein the modifying agent is HDTA.

TABLE 1

Water Vapour permeability of injected samples based on PLA 4042.

| Sample | WVTR (g · mm/m$^2$ · day) |
|---|---|
| PLA4042 | 5.08 |
| Nanocomposite prepared in Example 4d | 1.33 |
| Nanocomposite prepared in Example 4b | 2.31 |
| Nanocomposite prepared in Comparative Example 4 | 3.17 |

It was observed that WVTR was reduced when the phyllosilicates are added. The nanocomposites of the present disclosure show a higher reduction of WVTR than the closest prior phyllosilicates. Best results were reached with the nanocomposite prepared in Example 4d, with an improvement of 74%.

The same samples were prepared with PLA 2002 grade; results were presented in Table 2.

TABLE 2

WVTR results at 23° C. and 50% RH for the composites prepared with PLA2002.

| Sample | WVTR (g · mm/m$^2$ · day) |
|---|---|
| PLA2002 | 5.56 |
| Nanocomposite prepared in Example 4f | 1.85 |
| Nanocomposite prepared in Example 4e | 3.48 |
| Nanocomposite prepared in Comparative Example 5 | 5.24 |

The nanocomposites of the present disclosure show a high reduction of WVTR when the phyllosilicates are added. This reduction is higher than the PLA pure and the one showed by the closest prior phyllosilicate (comparative example 5). Best results were reached with the nanocomposite prepared in Example 4f, with an improvement of 67%.

Oxygen Transmission Rate Evaluation Over Samples Prepared with PLA Thermoforming Grade (PLA2002D).

Oxygen transmission rate was evaluated following standard ASTM D3985: "Standard Test Method for Oxygen Gas Transmission Rate Through Plastic Film and Sheeting Using a Coulometric Sensor". Experimental equipment was an OX-TRAN 2/20 SM. The measurement conditions were 23° C. and 50% relative humidity. The test was performed with oxygen (100%).

Results are presented in Table 3.

The results show the reduction in oxygen permeability of the nanocomposites of the present disclosure. The best improvement is observed with the nanocomposite prepared in Example 4b, with a reduction in oxygen permeability of almost 15%.

TABLE 3

Oxygen permeability results at 23° C. and 50% RH over the samples prepared with PLA4042 grade.

| SAMPLE | Transmission rate ml/[m$^2$ – day] | Permeability ml*mm/ m2*day*Mpa | Improvement respect to neat PLA % |
|---|---|---|---|
| PLA4042 | 11.6 | 176.8 | — |
| Nanocomposite prepared in Example 4b | 9.7 | 150.4 | 14.9 |
| Nanocomposite prepared in Example 4f | 10.9 | 167.4 | 5.3 |
| Nanocomposite prepared in Comparative Example 4 | 11.36 | 176.9 | −0.1 |

Thermal Properties

A differential scanning calorimetric technique was used to show what happens to the different nanocomposites (Ex. 4a, 4b, 4d and Comparative Ex. 4) and PLA 4042 when the nanocomposites and polymer reach melting temperature.

Figure 4:
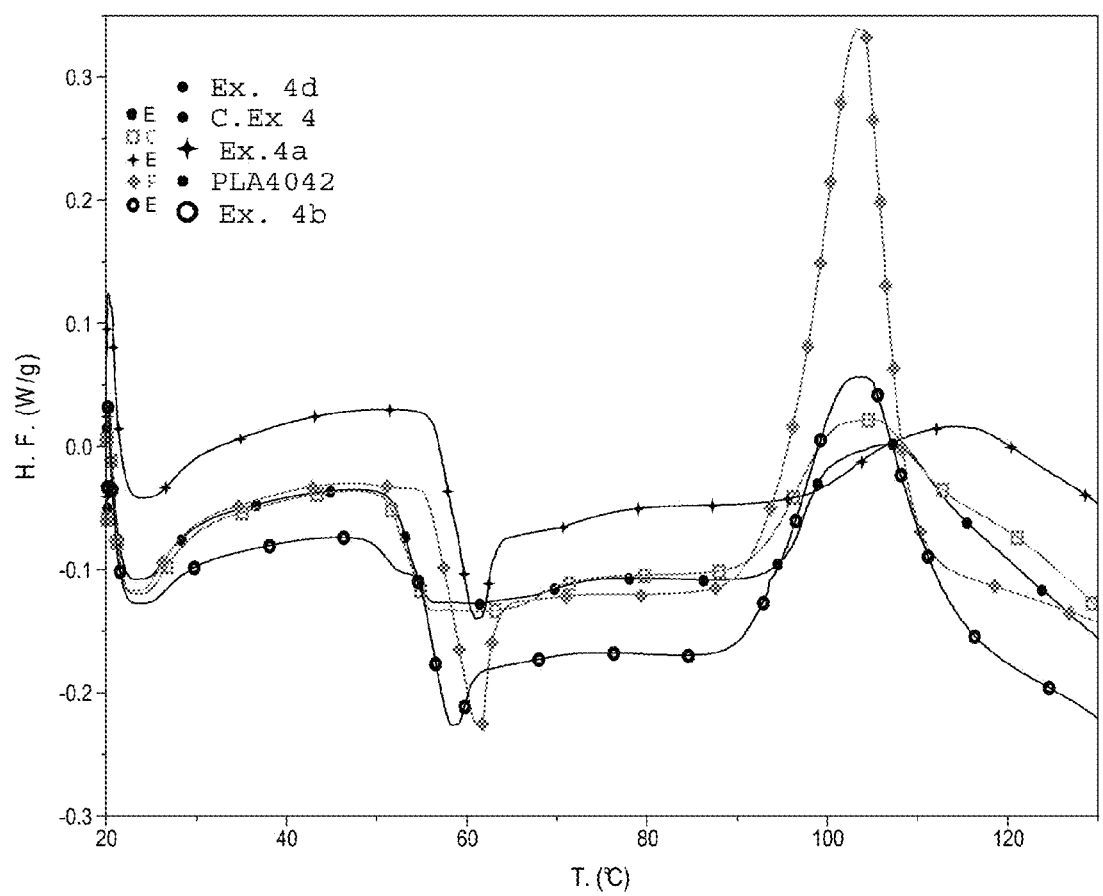
FIG. 4 shows a plot of the heat flow versus temperature of different samples.

The different samples were heated at a controlled rate and a plot of heat flow versus temperature was produced (FIG. 4).

For comparison purposes, included in this Figure was neat PLA 4042. It was observed that the nanocomposites of the present disclosure had melting points higher than PLA. The nanocomposites of the present disclosure present similar (Ex. 4d) or better (Ex. 4a) thermal properties than the nanocomposite with octadecyltrimethylammonium.

The invention claimed is:

1. A modified phyllosilicate composition comprising a montmorillonite and a modifying agent which includes hexadecyl trimethyl ammonium ions which are intercalated between the layers of the phyllosilicate and an additional modifying agent selected from the group consisting of acetylcholine and choline;
    wherein the acetylcholine or choline is present at a concentration comprised from 0.2-0.75 meq/100 g the value of the phyllosilicate cation exchange capacity and the hexadecyl trimethyl ammonium ions are present at a concentration comprised from 5.25-5.80 meq/100 g the value of the phyllosilicate cation exchange capacity; and,
    wherein the ratio phyllosilicate composition/polylactic polymer is comprised between 0.5:99.5 and 20:80 weight/weight ratio.

2. A process for the preparation of the modified phyllosilicate according to claim 1, which comprises:
    (a) dispersing the phyllosilicate in water and an $C_1$-$C_{10}$ alcohol;
    (b) applying an ultrasonic wave;
    (c) performing a cation exchange with choline salt or acetylcholine salt at a concentration comprised from 0.2-0.75 meq/100 g the value of the phyllosilicate cation exchange capacity;
    (d) performing a cation exchange with hexadecyl trimethyl ammonium salt at a concentration comprised from 5.25-5.80 meq/100 g the value of the phyllosilicate cation exchange capacity;
    (e) maintaining the mixture of operation (d) at a temperature comprised between 20° C. and 120° C.;
    (f) isolating the compound obtained in operation (d), wherein the operations a), b), c) and d) can be carried out in any order.

3. The process according to claim 2, wherein in the dispersing operation, the phyllosilicate is dispersed in water and ethanol.

4. The process according to claim 2, wherein the choline salt or acetylcholine salt added is choline halide or acetylcholine halide.

5. The process according to claim 4, wherein the choline halide or acetylcholine halide added is choline chloride or acetylcholine chloride.

6. The process according to claim 2, wherein the hexadecyl trimethyl ammonium salt added is a hexadecyl trimethyl ammonium halide.

7. The process according to claim 2, wherein the mixture of operation (d) is maintained at a temperature comprised between 65° C. and 75° C.

8. The process according to claim 2, wherein the cation exchange operation first is performed with the choline or the acetylcholine and afterwards is performed with the hexadecyl trimethyl ammonium salt.

9. The process according to claim 2, wherein the isolating operation comprises purifying the prepared modified phyllosilicate.

10. The process according to claim 9, wherein the phyllosilicate is purified with a solution of water:ethanol and the mixture is maintained under stirring at a temperature comprised between 50° C.-90° C.

11. The process according to claim 2, wherein the isolating operation comprises a drying operation of the phyllosilicate after the purification, the drying operation is carried out at a temperature comprised between 70° C.-90° C.

12. A method of using the modified phyllosilicate as defined in claim 1, as a reinforcing agent of polymers, the method comprising melt blending the polymer and the modified phyllosilicate as defined in claim 1.

13. The process according to claim 2, wherein the phyllosilicate is dispersed in water and ethanol; and the choline salt or acetylcholine salt added is choline halide or acetylcholine halide.

14. The process according to claim 13, wherein the choline halide or acetylcholine halide added is choline chloride or acetylcholine chloride.

15. The process according to claim 14, wherein the hexadecyl trimethyl ammonium salt added is hexadecyl trimethyl ammonium bromide.

16. The process according to claim 2 wherein the phyllosilicate is dispersed in water and ethanol; and the choline salt or acetylcholine salt added is choline chloride or acetylcholine chloride; and the hexadecyl trimethyl ammonium salt added is hexadecyl trimethyl ammonium bromide.

17. The process according to claim 2 wherein the mixture of operation (d) is maintained at a temperature comprised between 65° C. and 75° C.; the adding operation first is performed with the choline or the acetylcholine and afterwards is performed with the hexadecyl trimethyl ammonium salt; and the isolating operation comprises purifying the prepared modified phyllosilicate.

18. The process according to claim 17 wherein the phyllosilicate is purified with a solution of water:ethanol and the mixture is maintained under stirring at a temperature comprised between 50° C.-90° C.

19. The process according to claim 18, wherein the isolating operation comprises a drying operation of the phyllosilicate after the purification, the drying operation is carried out at a temperature comprised between 70° C.-90° C.

20. The modified phyllosilicate composition according to claim 1, wherein the acetylcholine or choline is present at a concentration comprised from 0.25-0.50 meq/100 g the value of the phyllosilicate cation exchange capacity, and the hexadecyl trimethyl ammonium ions are present at a concentration comprised from 5.55-5.75 meq/100 g the value of the phyllosilicate cation exchange capacity.

21. The process according to claim 6, wherein the hexadecyl trimethyl ammonium halide is hexadecyl trimethyl ammonium bromide.

* * * * *